(12) United States Patent
Briski et al.

(10) Patent No.: US 8,097,804 B1
(45) Date of Patent: Jan. 17, 2012

(54) CABLE PROTECTION SYSTEM

(75) Inventors: Mark J. Briski, Mequon, WI (US); Mark J. Hastings, New Berlin, WI (US); William H. Strohmenger, Cedarburg, WI (US); Kevin L. Willmorth, Germantown, WI (US)

(73) Assignee: Oldenburg Group Incorporated, Glendale, WI (US)

( * ) Notice: Subject to any disclaimer, the term of this patent is extended or adjusted under 35 U.S.C. 154(b) by 529 days.

(21) Appl. No.: 12/389,125

(22) Filed: Feb. 19, 2009

Related U.S. Application Data

(60) Provisional application No. 61/066,191, filed on Feb. 19, 2008.

(51) Int. Cl.
*H01B 11/06* (2006.01)

(52) U.S. Cl. .......... 174/36; 174/74 R; 174/78; 362/391; 362/404; 362/285

(58) Field of Classification Search .......... 174/36, 174/74 R, 78, 79, 84 R, 86, 88 R, 72 A, 40 CC, 174/68.3, 73.1, 70 A, 99 R; 362/147, 285, 362/391, 404; 248/325, 328, 56
See application file for complete search history.

(56) References Cited

U.S. PATENT DOCUMENTS

| | | | | |
|---|---|---|---|---|
| 6,183,297 | B1 * | 2/2001 | Kay et al. | 439/578 |
| 6,517,222 | B1 * | 2/2003 | Orlov | 362/391 |
| 2003/0095412 | A1 * | 5/2003 | Weinhuber | 362/391 |

* cited by examiner

*Primary Examiner* — William Mayo, III
(74) *Attorney, Agent, or Firm* — C. Thomas Sylke; Sylke Law Offices, LLC

(57) ABSTRACT

A cable protection system protects a cable, such as an insulated conductor, data line, fluid or gas conduit, power cord, communication line or the like. The cable passes through a pair of ferrules that are separated by a segment of the cable. A protective jacket made of braided metal strands or the like encloses the ferrules and the cable segment and is held in place to the ferrules by jacket securing means. In one embodiment, support collars surround a portion of the braided jacket and a portion of each ferrule so that the braided jacket is securely held between each ferrule and support collar combination when a loading force, such as a gravitational loading or suspension force, is applied to the cable segment, typically in an axial orientation. The braided jacket has a diameter that constricts when an axial loading force is applied, protecting the cable segment from damaging stress by gripping the ferrules and the cable segment. A generally even compressive force can be applied along the cable length in some embodiments, which prevents undesirable stretching or other damage to the cable segment.

18 Claims, 9 Drawing Sheets

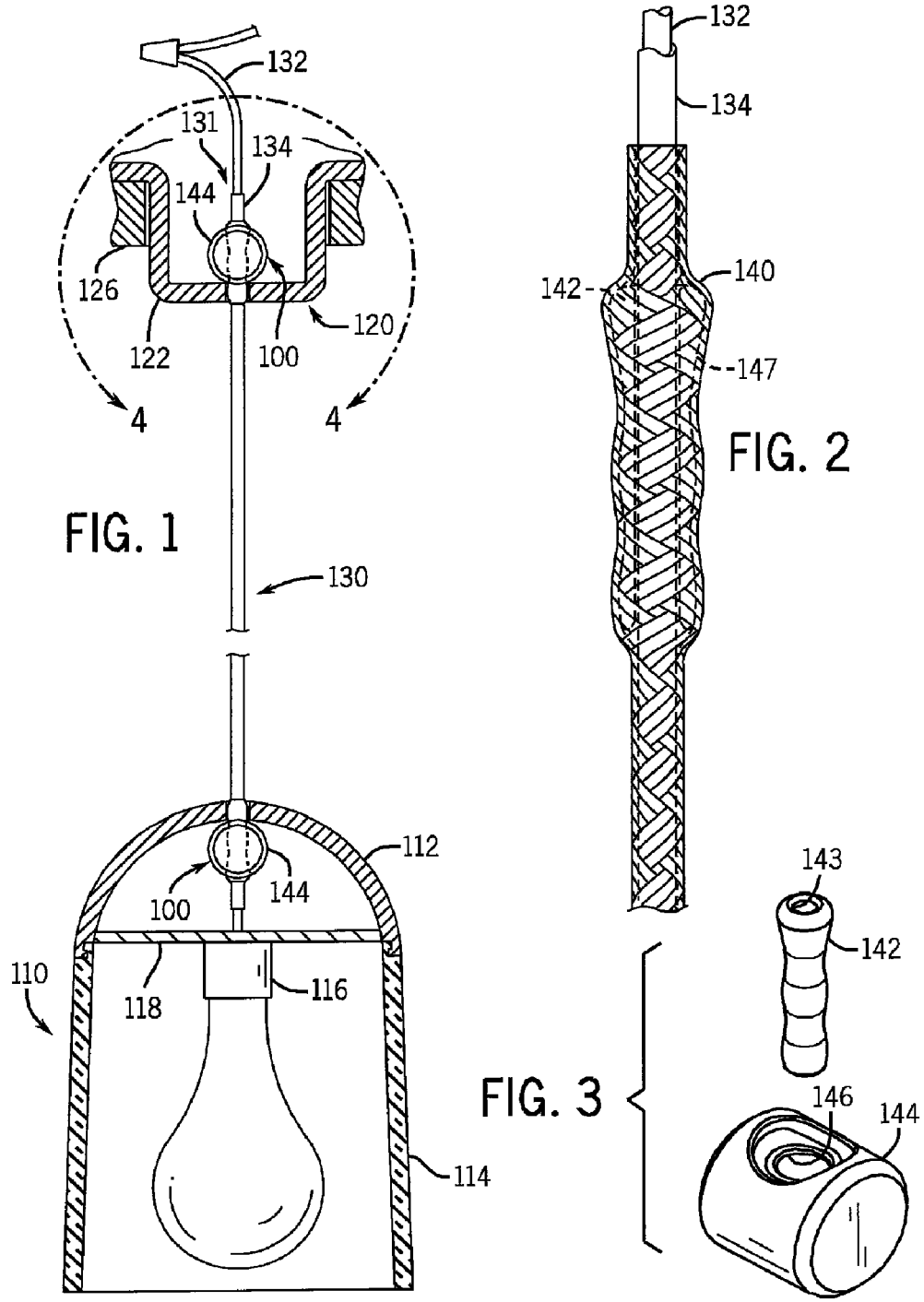

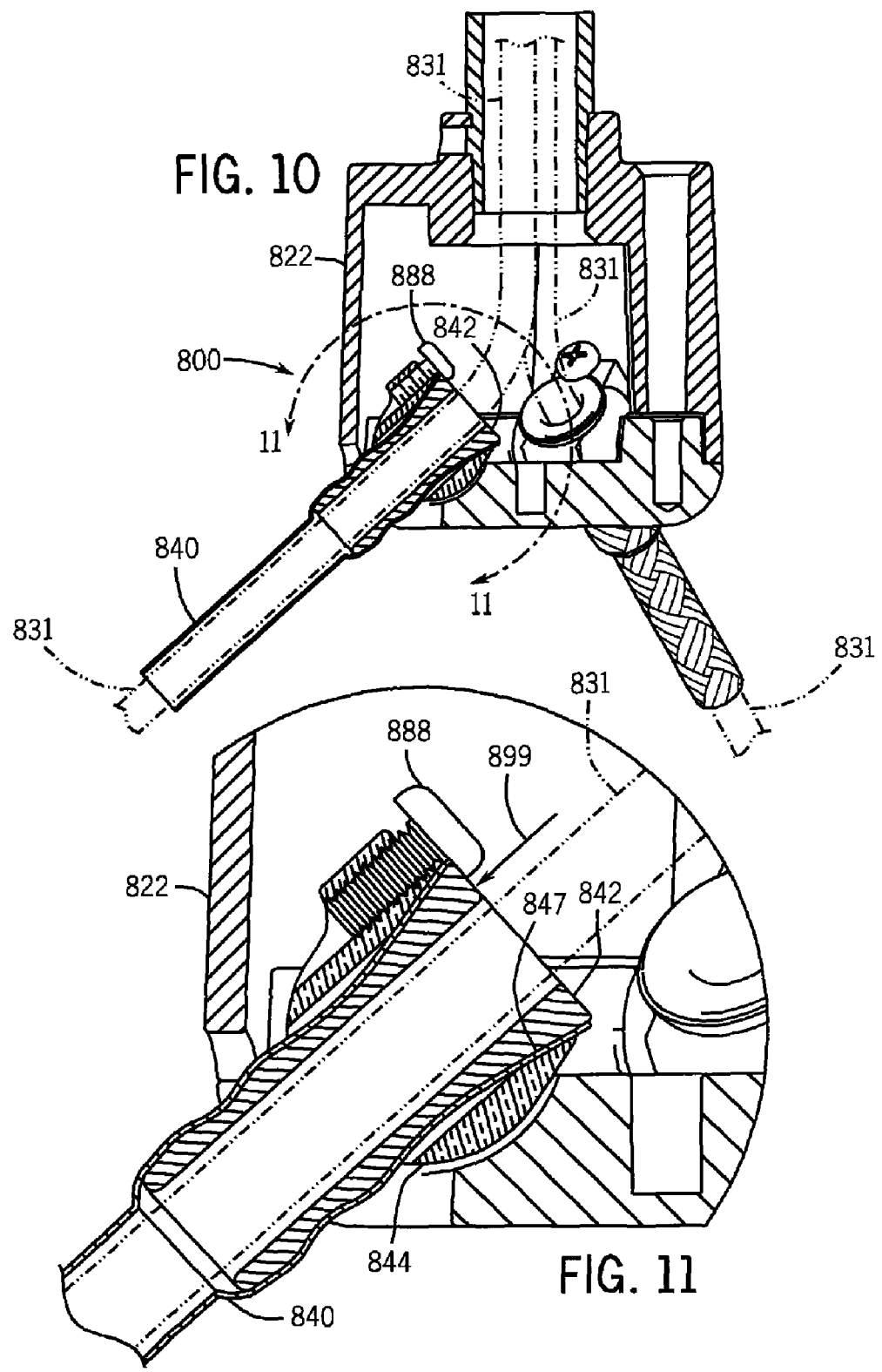

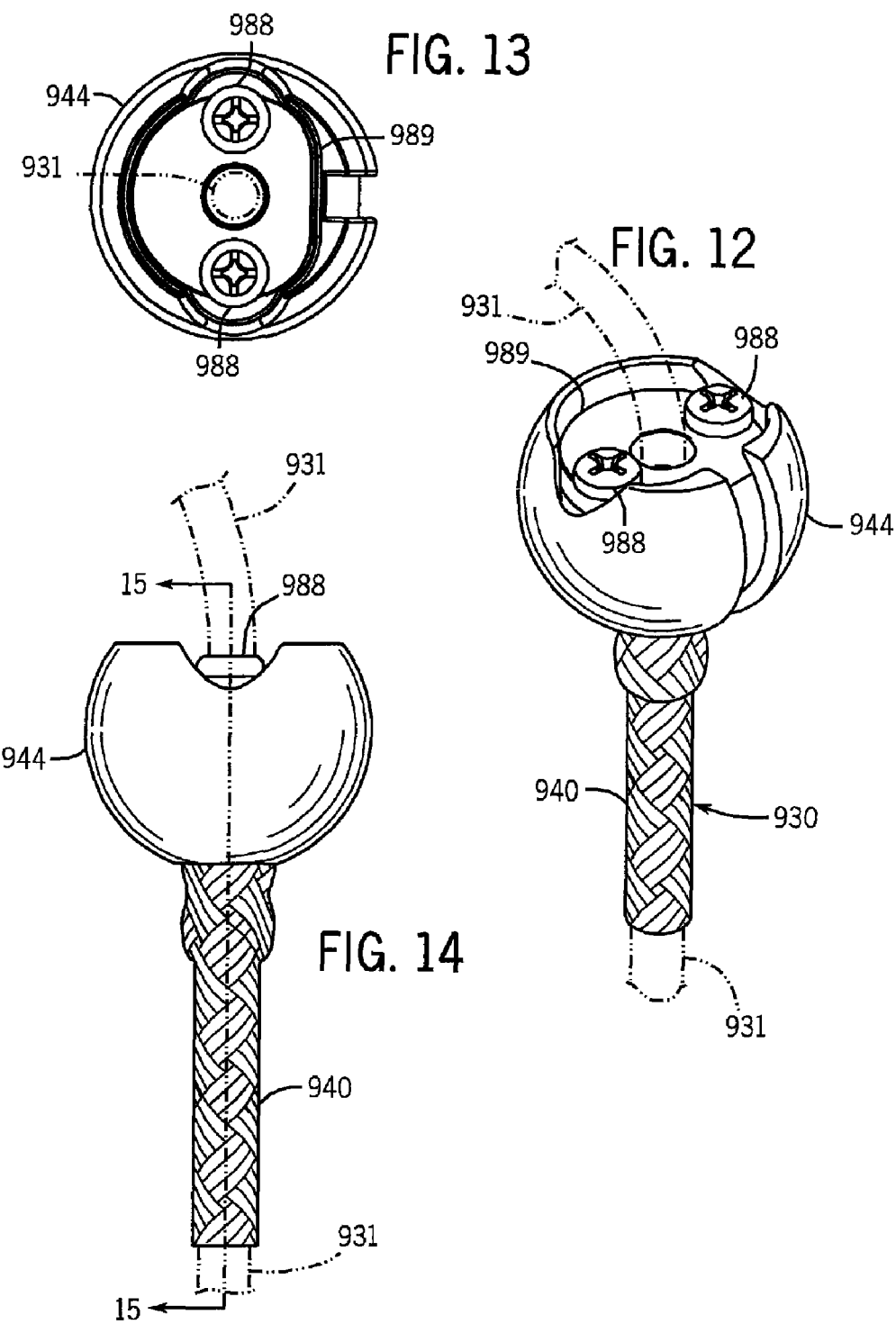

CABLE PROTECTION SYSTEM

CROSS-REFERENCE TO RELATED APPLICATIONS

This application claims the benefit of priority under 35 U.S.C. §119(e) and any other United States or other law of the following: U.S. Ser. No. 61/066,191 filed Feb. 19, 2008, entitled CABLE PROTECTION SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

Various embodiments described herein relate generally to methods, systems and apparatus for securing and protecting a cord, conductor, hose, fiber, line or other pathway for transmitting energy, data or material.

2. Description of Related Art

An electrical conductor typically consists of a metallic wire surrounded by electrical insulation. Similarly, a power cord usually has an outer jacket that protects one or more conductors and any insulation within the jacket. Generally, a "conduit" is any channel, pathway, pipe, tube, duct, etc. that provides transport and/or protection to whatever is inside of or passing through it (for example, a fluid, gas, electricity, optical signal, etc.). A power cord or electrical cord jacket is therefore a particular type of cable or conduit that is flexible and protects the conductors inside.

Electrical cords and the like that are maintained in tension (for example, suspended) to provide power to various devices (for example, hanging lights and lamps) typically have served two functions. First, the cord provides a source for electricity to one or more devices. Moreover, the cord typically bears the weight of the device to which power is being supplied and/or other loading force(s). For example, where a light fixture is suspended from a ceiling or other vertically separated support, the power cord typically bears the light's weight and any other forces that might act on the light and/or cord. The stresses on the cord can damage the conductors inside and/or the light fixture connected thereto. Some systems, called "cord grips" or "strain reliefs," currently exist for reducing the risk of such damage. These systems rely on compression and/or frictional forces acting on the electrical cord as a whole. Since the forces act on the cord as a whole, these systems are inherently limited to the combined construction of both the electrical cord jacket and the conductors therein. Systems of this type are therefore limited to light loads, traditionally 10 pounds or less.

Systems, apparatus, methods and techniques isolating a conductor, insulated conductor, hose, cable, fiber, filament, tube, etc. from potentially damaging weight-bearing and/or other force-bearing situations would represent a significant advancement in the art.

BRIEF DESCRIPTION OF THE DRAWINGS

This disclosure will be readily understood in light of the following detailed description in conjunction with the accompanying drawings, wherein like reference numerals designate like structural elements, and in which:

FIG. 1 illustrates a light fixture suspended from a mounting bracket using a cable protection system.

FIG. 2 is a detailed illustration of one or more embodiments of a cable protection system.

FIG. 3 illustrates a ferrule and collar usable in a cable protection system.

FIG. 10 is a cross-sectional view of a cable protection system taken along the line 10-10 of FIG. 8.

FIG. 11 is a detailed view of the cable protection system within the line 11-11 of FIG. 10.

FIG. 12 is a perspective view of an embodiment of a cable protection system.

FIG. 13 is a top view of the cable protection system of FIG. 12.

FIG. 14 is a side view of the cable protection system of FIG. 12.

DETAILED DESCRIPTION

Figure 4:
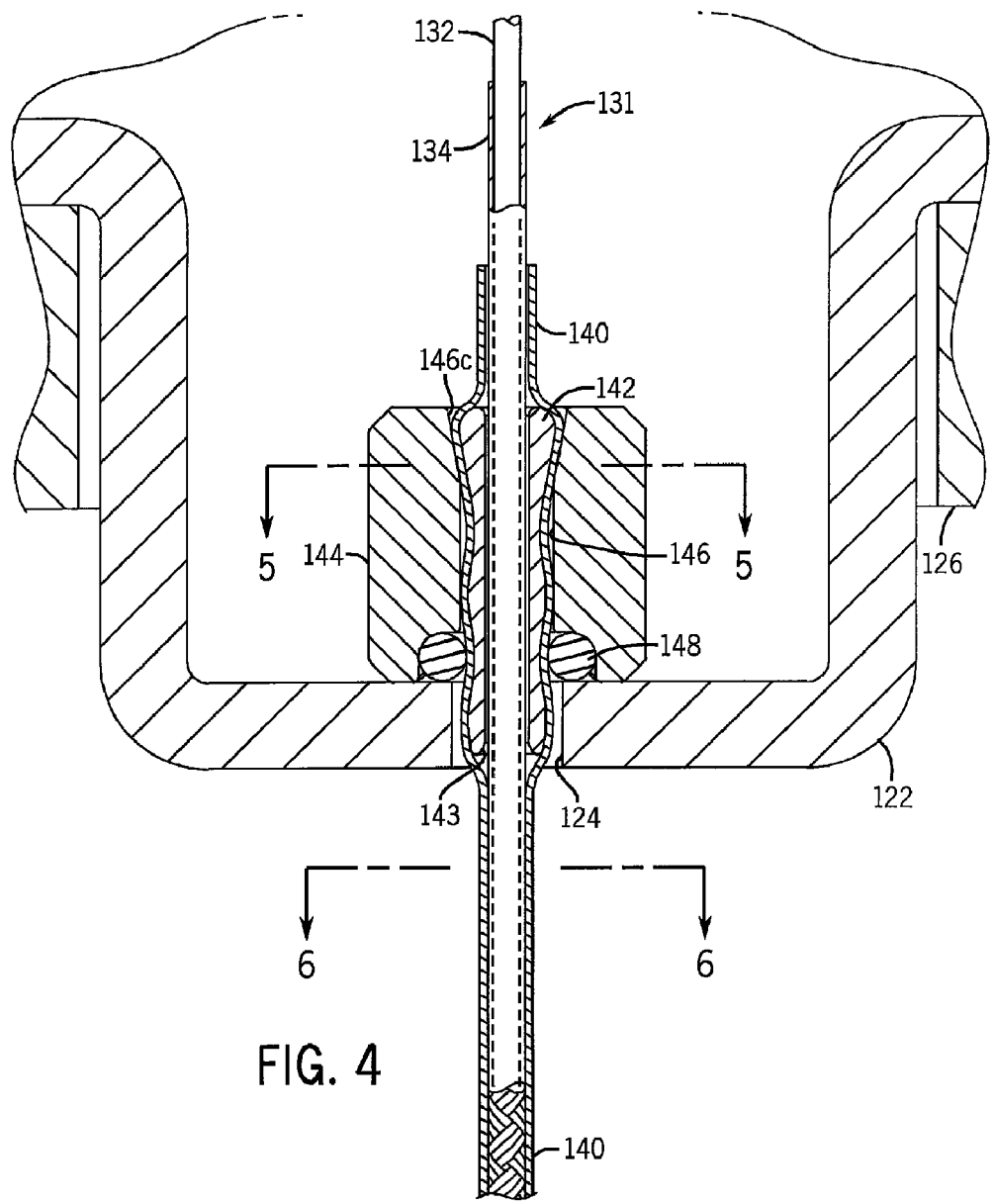
FIG. 4 is a cross-sectional view of a cable protection system within the line 4-4 of FIG. 1.
Figure 5:
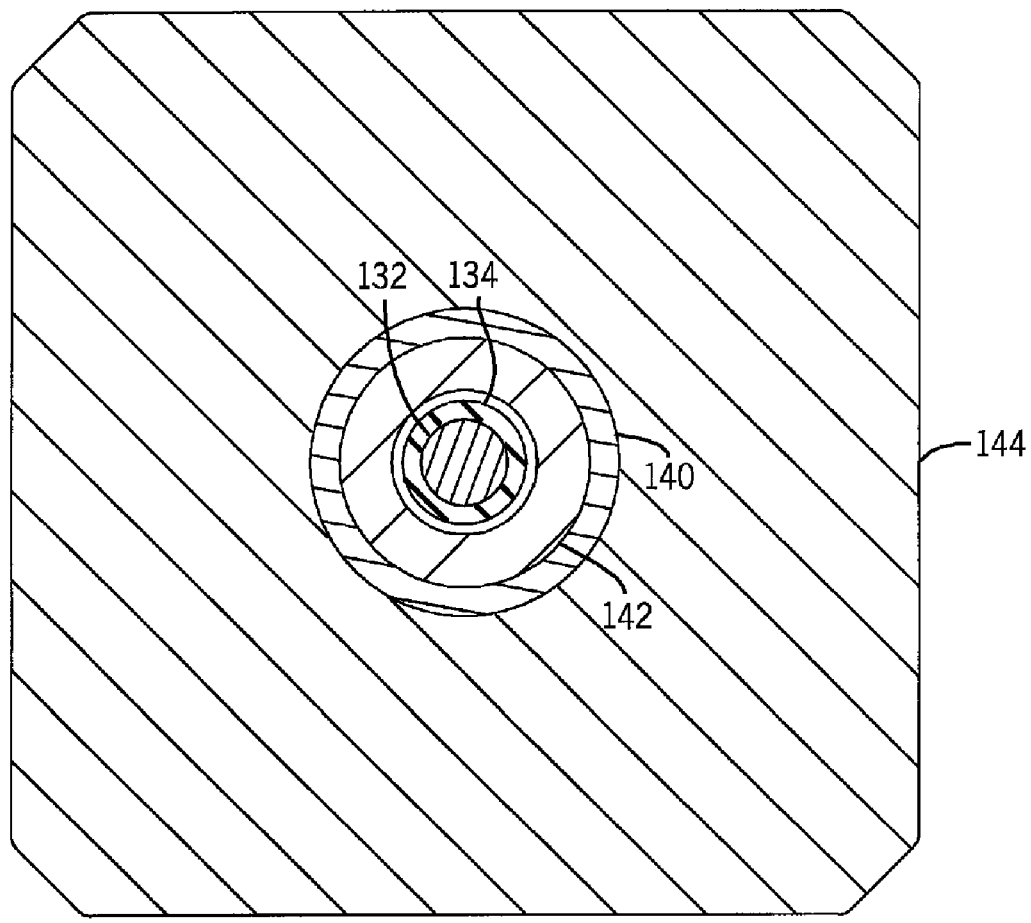
FIG. 5 is a cross-sectional view of a cable protection system taken along the line 5-5 of FIG. 4.
Figure 6:
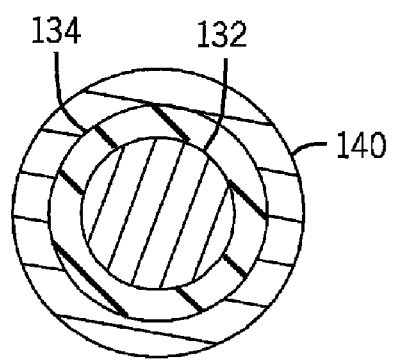
FIG. 6 is a cross-sectional view of a cable protection system taken along the line 6-6 of FIG. 4.

The following detailed description will refer to one or more illustrative and non-limiting embodiments of the invention(s), but is not restricted to such embodiments. Rather, the detailed description is intended only to provide examples of the invention(s), which may be interpreted more broadly than any or all of the exemplary embodiments provided. Therefore, those skilled in the art will readily appreciate that the detailed description given herein with respect to the Figures is provided for explanatory purposes only, as any invention disclosed herein may extend beyond these described and/or illustrated embodiments.

As used herein, a "cable" is a connection, link, line and/or pathway between a source and a destination, where the "cable" typically is elongated or tubular in form, such as the shape of a power cord, coaxial line, hose or wire. For example, as used in connection with the present description of various embodiments, a cable can include (but is not limited to) one or more power cord(s), electrical conductor(s) (including insulator-encased conductors such as wires), optical fiber(s), data line(s), communication line(s), fluid conduit(s), gas conduit(s), etc.

Some exemplary embodiments of a cable protection system employ a braided "jacket" serving both as a decorative/ornamental flexible structure and as a support for loads (including, but not limited to heavy loads such as those exceeding 10 pounds), while not applying "shear" stress(es)

to or on any cable inside the protective jacket. Even though 10 pounds may be considered a "heavy load" in some settings, the cable protection system disclosed herein is not limited to any particular weight category, range, etc. (unless specified as such in the claims), in light of the fact that a person skilled in the art will be able to readily adapt the cable protection system to a wide variety of settings, loads, etc.

The previously-referenced braided configuration resembles a children's "finger trap toy." "Shear" stress is a localized stress perpendicular to the element inside much like the stress applied by a scissors shearing paper. The children's finger trap toy action does put a generally uniform "compressive" stress on the elements inside which is far less damaging because (1) the load is spread out along the entire length of contact between the jacket's strands and the element inside them, and (2) the gripping hold of the protective jacket prevents excessive stretching of the enclosed cable, such as would occur if the cable alone was bearing the entire loading force.

In some examples, the enclosed cable happens to be a power cord, which usually includes a jacket made of PVC or the like. The protected cable can be one or more individual conductors without such a PVC or other jacket. Because the braided jacket can be the outermost wall protecting the enclosed cable, any such enclosed conductors, gas lines, fluid lines etc., the braided jacket can replace flexible and other conduit currently used, providing a more aesthetically pleasing, more flexible alternative that also isolates the jacket's contents from shear stress(es). Types of conduit that can be replaced using embodiments of the invention include (but are not limited to): intermediate metal conduit; rigid metal conduit; galvanized rigid conduit; flexible metal conduit, which is a helically wound circular wireway, often used at the end of a rigid run of conduit to accommodate machinery positioning or orientation; rigid nonmetallic conduit, wherein different types of plastics can be used, typically for areas that are wet or corrosive; liquid-tight flexible nonmetallic conduit, typically placed over an inner flexible, nonmetallic core; electrical metallic tubing, and/or electrical nonmetallic tubing which is a circular corrugated wireway typically made from PVC.

While the exemplary protective jacket described herein typically is braided metal (in a pattern akin to a children's finger trap toy), equivalent embodiments of the protective jacket are deemed to be included, wherein the protective jacket is flexible, encloses the protected cable and eliminates the shear stress(es) otherwise applied to the protected cable. The protective jacket preferably is aesthetically suitable so that no further covering or apparatus needs to be provided to enclose the protective jacket.

The "children's finger trap" action of the strong braided strands forming the protective jacket of some embodiments tighten around peaks and valleys of one or more ferrules (or any equivalent structure) captivated and supported by a generally conical region of each ferrule inside a matching conical region in a ferrule supporting structure such as a collar. The action of tightening around the ferrule peaks and valleys evenly transfers the load of individual strands, thus securing the jacket to each enclosed ferrule. This reduces the stress on individual strands to maximize the total strength of the assembly.

A cable protection system protects one or more cables from shear forces that would otherwise act on the cable(s) due to one or more loads, devices, etc. being coupled to the cable(s). Using a braided jacket, as described below, the cable is subjected to substantially less stretching and is likely subjected to some uniform compressive stress along its entire length, but without damaging results and/or consequences. Current systems such as an SJT type power cord bearing a load of 10 pounds applied axially would likely stretch approximately 0.35%. Embodiments of the cable protection system disclosed herein can limit such stretching to only approximately 0.13% while bearing a 50 pound load. Embodiments of the invention thus can limit damage-inducing stretching while providing substantially more strength. Thus, where a light, lamp or other electrical device is suspended from a ceiling, overhead mounting bracket or the like, embodiments of the invention can reduce, forestall or prevent short circuits, breakage and/or other damage that might otherwise result from stress(es) applied to conductors (acting as one or more "cables").

As noted above, the cable protection system can include one or more of a variety of "cables," such as communication lines, data lines, optical fiber, fluid conduits, gas conduits, etc. A cable coupled to a load exerting or under an axial loading force, as would happen with a vertical loading force applied when an electrical device is suspended using a power cord, will be referred to as a "suspended cable" for purposes of some illustrations, though one or more other pulling forces (other than gravity) might be applied in addition or instead of gravitational pulling of the load.

Ferrules at one or more locations along the suspended cable permit the protective jacket to be coupled to one or more mounting structures, as described in more detail below. The phrases "coupled to" and "connected to" and the like are used herein to describe a connection between two elements and/or components and are intended to mean coupled either directly together, or indirectly, for example via one or more intervening elements, where appropriate.

In some earlier suspended electrical systems, the electrical device was suspended from a mounting bracket (for example, a bracket or other structure coupled to a ceiling) by the electrical device's power cord. This resulted in one or more components in the power cord bearing the weight of the electrical device, which could lead to breaking of the power cord and/or other damage. Some components of the power cord would stretch, while the enclosed conductor(s) would not, thus leading to conductor breakage and/or other damage.

In other earlier suspended electrical systems and the like, especially heavier ones, a weight-bearing suspension set (which included one or more weight-bearing lines and/or other connectors) was used to suspend one or more devices from a mounting bracket or the like (for example, a ceiling). In addition, a power cord set (including one or more power cords or other conductors) distinct from the suspension set then supplied electrical current to the suspended device(s). Embodiments of the claimed cable protection system eliminates the need for two visibly distinct connections between a device (or other load) and a mounting bracket or equivalent suspension support. Moreover, the present invention protects a suspended cable such as a power cord more effectively than earlier systems by encasing any conductors in a protective jacket that mitigates or removes shear stress(es) that might otherwise damage a power cord, conductor, data line, optical fiber or other cable enclosed in the protective jacket. Embodiments of a cable protection system can substantially reduce or eliminate damaging stretching/elongation of the enclosed cable by applying a generally even compressive force along the length of the cable that is enclosed in the protective jacket. Other embodiments protect the enclosed cable without applying the compressive force. In such embodiments of the cable protection system, the protective jacket may constrict to a reduced diameter that does not bring the protective jacket into substantial (or any) contact with the enclosed cable. The enclosure of the cable by the protective jacket, and the protective jacket's reduced or limited elongation/stretching nevertheless protects the enclosed cable from damage caused by stress(es) induced by an axial tension force such as suspension.

FIGS. 1-6 illustrate suspension of a lamp unit 110 from a ceiling mounting unit 120 by a cable protection system 130. The lamp unit 110 includes a hemispherical housing 112 to which a shade 114 is attached. A light bulb fixture 116 is coupled to a mounting bracket 118. The ceiling mounting system 120 uses a mounting bracket 122 having an access hole 124. Bracket 122 is attached to and/or suspended from a ceiling support member 126 or the like.

The cable protection system 130 in this embodiment is a conductor protection system protecting a power cord or other insulated conductor assembly 131 for the lighting fixture 116. Using the cable protection system of FIGS. 1-6, a power cord would contain one or more insulated conductor assemblies 131 and a number of conductors can be provided, as will be appreciated by those skilled in the art. Each conductor 132 can be encased in an insulator 134, as is well known to those skilled in the art, and can be made of copper or any other suitable material. Insulator 134 can be made of any suitable insulation material. In one embodiment, each conductor 132 is 18 AWG 19/30 bare copper with an insulator 134 of 0.010 inches of PFA (Teflon) insulation to conform to and comply with UL AWM style 10313, 200° C., 600V.

A protective jacket 140 is used in FIGS. 1-6 to protect insulated conductor 131 from shear stress(es) when the lamp unit 110 is suspended from mounting unit 120. Jacket 140 is tubular or cylindrical and can cover or otherwise enclose one or more suspended cables or the like (for example, one or more conductors carrying electrical current to the lamp unit 110). In some embodiments, both ends of the protective jacket 140 are coupled to other elements, components, etc. using securing means described in more detail below. The securing means in some embodiments comprises elements that hold jacket 140 by exerting a compressive force on the jacket 140 against a ferrule 142. In some of these embodiments, jacket 140 is a braided jacket that is held between a ferrule and a support collar, wherein the jacket encloses at least a portion of the ferrule and the support collar surrounds at least a portion of the braided jacket and ferrule. Additional force can be applied to hold the protective jacket using the securing means, as will be noted in connection with other embodiments, for example by captivating screws and/or washers to prevent the protective jacket 140 from being dislodged from the support collar. As will be appreciated by those skilled in the art, other embodiments of the securing means can be employed (for example, epoxy holding the jacket in place, one or more screws securing the braided jacket to a ferrule, one or more clamps securing the braided jacket to a ferrule, etc.).

The protective jacket 140 can be made of stainless steel braided strands in some embodiments. For example, a braided jacket can be made of 34 Ga. Type 304 stainless steel braided in a 24-7-34 or other suitable pattern to allow sufficient strength and flexibility that encases one or more suspended cables (for example, conductors, cords, etc.) and can be filled with a polyester or polypropylene filler in the interstices between any conductors, cords, etc. to maintain a round appearance. Moreover, the conductors, cords, fillers, etc. can optionally be encased in a 0.030" black PVC skin or jacket to UL AWM 2586 105C 600V to further protect and contain the elements for assembly operations. Under load, the braided jacket can be in full or substantial contact with its cable contents.

The braiding of protective jacket 140 functions in a manner similar to a children's finger trap toy, which typically is made out of paper. The generally cylindrical braided jacket has a first diameter when no tensile axial load is placed on the jacket. However, when the jacket 140 is subjected to a tensile axial load and/or force, its diameter generally shrinks and the braided jacket's strands "grip" objects inside the jacket (for example, any enclosed cable and any ferrules or the like used in connection with the securing means). As will be appreciated by those skilled in the art, when a tensile axial load is applied to braided strands, the braiding radially constricts and causes the individual strands to tighten across peak and valley features on each ferrule 142, through which the enclosed cable passes. This action transfers the axial tension force/load amongst the individual braids to the ferrule so that the full load is not transferred directly at the conical pinch region 147 of a ferrule 142, which is the point at which the ferrule 142 and collar 144 are in contact and would otherwise bear the load. This technique reduces total stress(es) in the ferrule pinch region 147 that would otherwise result in mechanical failure of the individual strands. In addition, the angle at which the individual strands enter the pinch region increases the total surface area over which the strand is pinched, thereby decreasing the total stress.

As seen in FIGS. 2 and 4, the constriction characteristic of the protective jacket 140 "grasps" one or more ferrules 142 held within jacket 140. Each ferrule 142 has a hole or channel 143 and can be made of any suitable material, for example nickel-plated brass. Ferrule shape is dictated by the manner in which each ferrule 142 is used to protect each cable passing therethrough, and those skilled in the art will be able to easily adjust and/or determine particular characteristics of ferrule design required to achieve desired results. Channel 143 has a large enough diameter to allow each cable to pass through the ferrule, in some cases leaving some spacing between the channel 143 and cable if desired.

In the exemplary embodiment(s) of FIGS. 1-6, each ferrule 142 is used in connection with a captivating collar, such as cylindrical swivel collar 144 shown in FIGS. 1, 3 and 4. The securing means in this embodiment comprises the collar 144, which holds the ferrule 142 that is captured within protective jacket 140. Where gravity is the only force acting on the suspended cable, that force maintains ferrule 142 fitted within collar 144, thus securing jacket 140. As otherwise noted, other securing means achieving comparable or better holding of the jacket 140 are equivalent to this securing means. Other securing means disclosed herein can comprise one or more O-rings, captivating screws and/or washers. Still other securing means will be apparent to those skilled in the art.

Swivel collars, swivel balls, and other "dynamic" captivating mounting structures maintain a generally consistent load amongst and across all strands of a braided jacket or the like, holding the braided jacket against the ferrule, thus improving the jacket's strength and durability. As shown in more detail in FIGS. 3 and 4, a swivel collar 144 (which can be made of nickel-plated brass, for example) has a hole or channel 146, at least a portion 146C of which is conical or otherwise constricted. A segment of the wall of channel 143 of ferrule 142 and the portion of the protective jacket 140 surrounding ferrule 142 engage surface 146C to hold the jacket 140 against axial displacement (for example, slipping). Moreover, the jacket's enclosure and protection of insulated conductor assembly 131 means that insulated conductor 131 is not subjected to shear stress(es) otherwise applied by loading an unprotected insulated conductor or the like. As can be seen in FIGS. 1-6, there may be some space between the inner surface of ferrule hole 143 and the insulator 134. In the embodiment of the present invention shown in FIG. 4, an O-ring 148 (for example, made of high temperature black viton rubber) also can be used in some embodiments, though it is not required in all, in conjunction with the swivel collar 144 and ferrule 142 to help improve securing the protective jacket 140.

As can be seen from the Figures, the various fittings capture the protective jacket so that the protective jacket supports a load, without the load applying any shear stress(es) on any enclosed cable (for example, any conductor(s) and/or insulator(s) in the jacket). A dynamic mounting structure such as swivel collar 144 maintains a consistent, generally even load on all strands of the braided jacket 140, thus maximizing the jacket's strength. In some embodiments, collar 144 can be swiveled up to 45° from vertical in one direction. In some embodiments using a braided protective jacket, rated loads per assembly can range from 25 pounds for a single conductor configuration to more than 50 pounds for a 3 conductor configuration, being somewhat proportional to the number of strands the braided jacket contains.

To assemble the components of system 130 of FIGS. 1-6, O-ring 148 and swivel collar 144 are first slipped over the braided jacket 140. A ferrule 142 then is slipped over one or more cables (including, for example, any filler materials) and slid inside jacket 140. Collar 144 is then slipped up over the ferrule 142, securing the jacket 140 between the support collar 144 and the ferrule 142. O-ring 148 then is slipped up over the ferrule 142 until the O-ring 148 contacts the bottom of the collar 144 to keep collar 144 in place until a load is applied to the assembly 130.

The securing means of protection system assembly shown in FIGS. 1-6 can be inverted and applied at the lower end of the cable adjacent the lighting fixture 116 or other device(s). This allows the securing means to function similarly in securing both ends of jacket 140 in suspension system 130, if desired.

Figure 7:
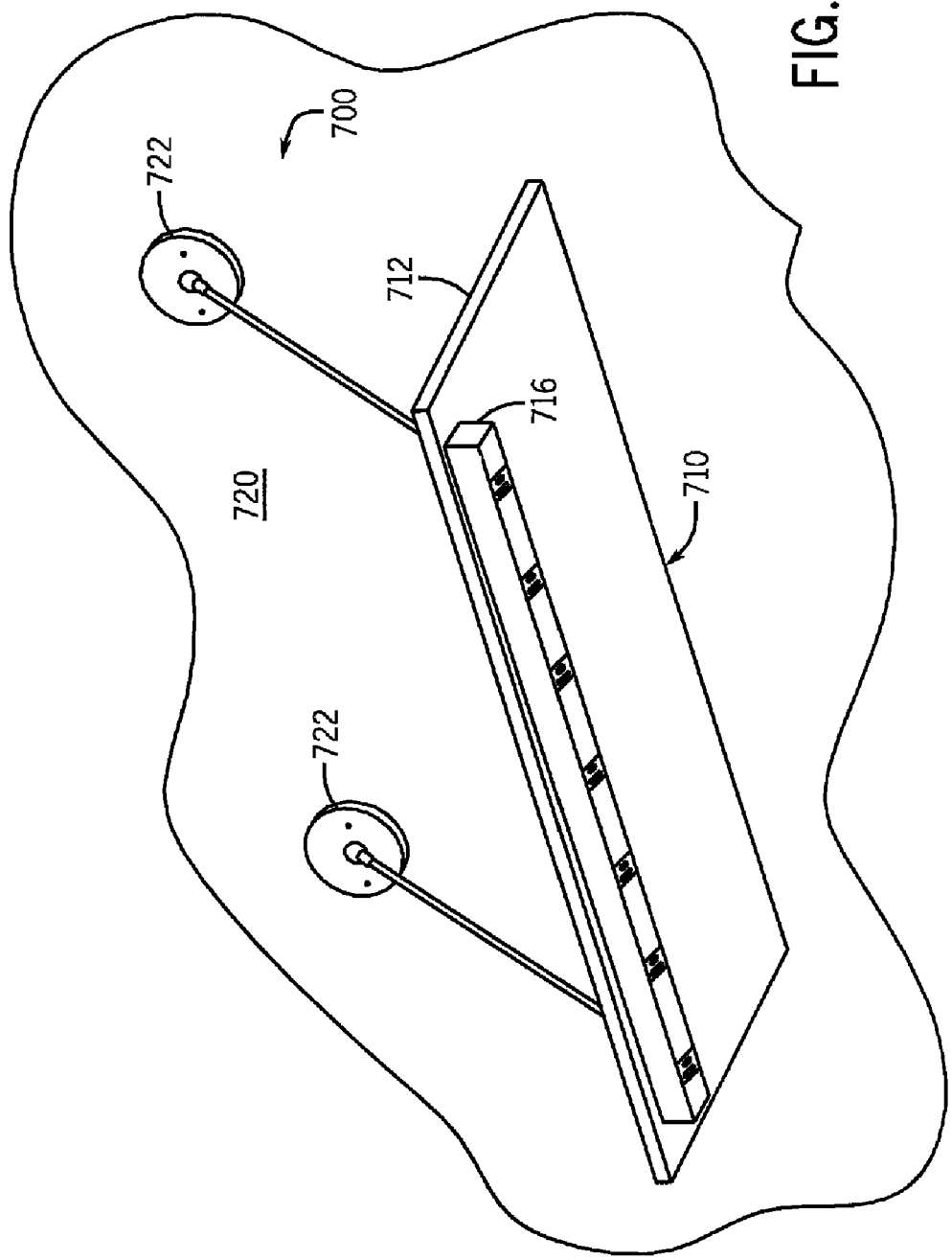
FIG. 7 is a cable protection system in a wall-mounted orientation.
Figure 8:
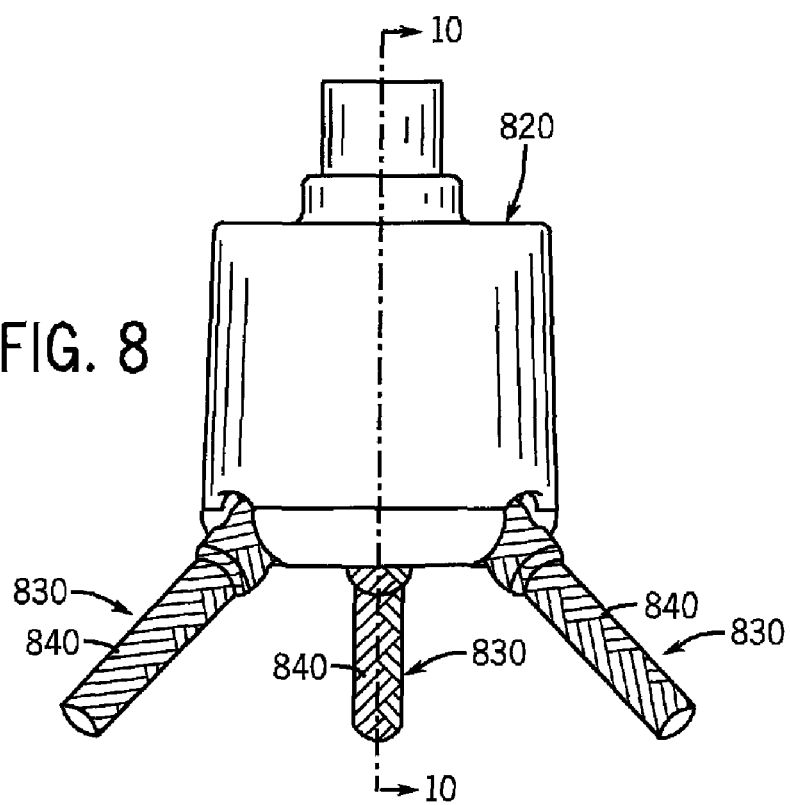
FIG. 8 is a side view of an embodiment of a cable protection system.
Figure 9:
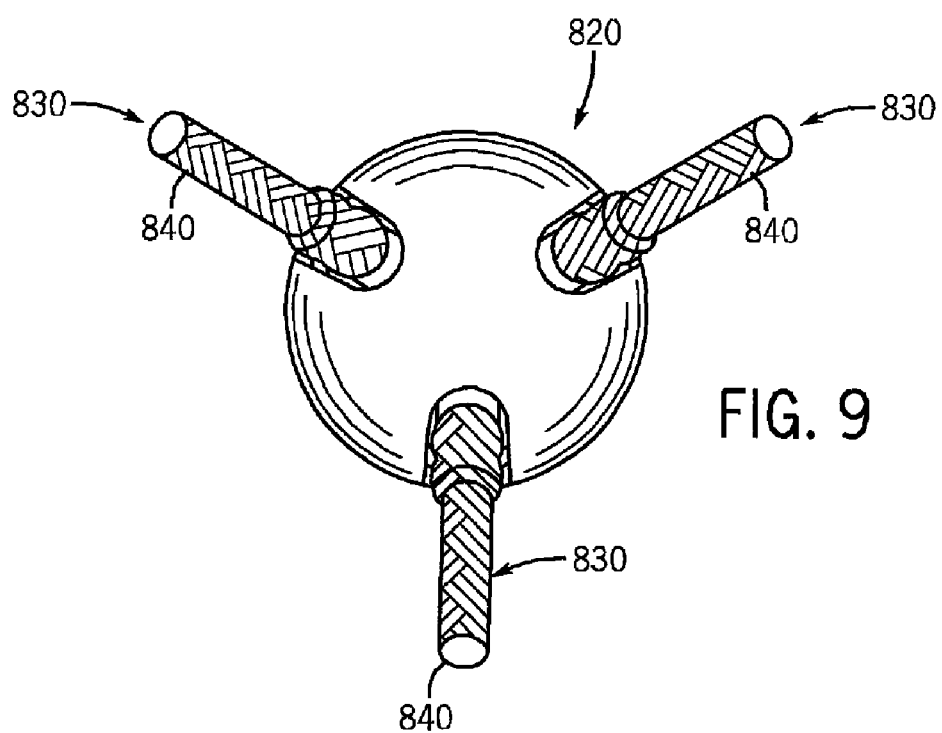
FIG. 9 is a bottom view of the cable protection system embodiment of FIG. 8.
Figure 15:
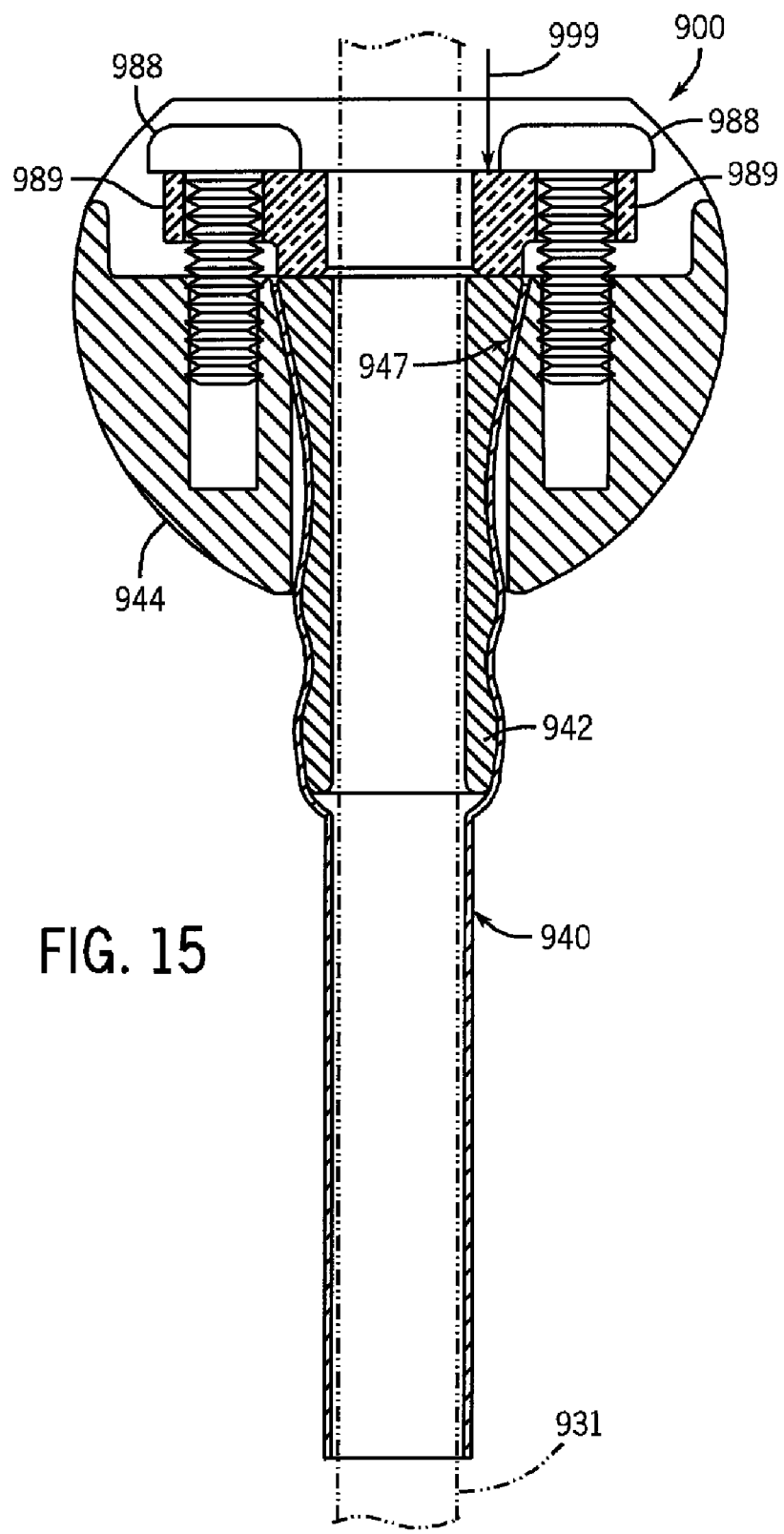
FIG. 15 is a cross-sectional view of a cable protection system taken along the line 15-15 of FIG. 14.

Another embodiment of a cable protection system 700 is illustrated in FIG. 7. Rather than being mounted from a ceiling or other vertically direct overhead structure, an electrical device unit 710 is suspended from a wall 720 or other similar mounting surface or point. A wall canopy 722 acts as mounting bracket. The electrical device unit 710 can include a power strip 716 or the like mounted to a shelf 712 or other mounted structure. The shelf 712 can support a number of electrical devices plugged into the power strip 716 without the need for electrical outlets in the wall or numerous electrical cords extending out of the wall 720. In other situations, the cable protection system can be used to protect data and/or communication lines coupled to one or more computers, projectors, televisions, monitors and/or other device located on the shelf without the need for various cables visibly running out of the wall 720.

Yet another embodiment of a cable protection system 800 is shown in FIGS. 8-11. An overhead mounting unit 820 has three suspension links from which one or more lighting units or other electrical devices are suspended vertically or at an angle to direct vertical. At least one of these links 830 uses the cable protection system 800 to protect an enclosed cable 831, which might be an insulated conductor or the like. As seen in FIGS. 10 and 11, the securing means comprises a swivel collar 844 acting as the mounting support for a ferrule 842 that secures a braided jacket 840. In system 800 the braided jacket 840 is further secured by applying an axial force on the end of ferrule 842 that is adjacent to the conical pinch region 847. This supplemental securing force is applied in the embodiment of FIGS. 10 and 11 using a captivating screw 888 as part of the securing means. Screw 888 is threaded into the swivel collar 844 and applies a force in the direction of arrow 899, thus captivating ferrule 842 and maintaining and/or increasing the holding force applied inside the conical wall 847 of collar 844. Braided jacket 840 is situated between the ferrule conical engagement surface and the collar's inner wall, more firmly securing the jacket 840 against slippage due to swaying and/or dynamic, vibratory or other movement of the link 830.

Still another embodiment of a cable protection system 900 is shown in FIGS. 12-15, protecting an enclosed cable 931, which might be an insulated conductor or the like, and creating a protected cable link 930. An overhead mounting unit uses a swivel ball support structure 944 in lieu of a cylindrical swivel collar to improve the rotational properties for the electrical device or other structure being suspended. Ball 944 has a channel with a conical or frusto-conical support surface where the braided jacket 940 is held securely between the swivel ball 944 and ferrule 942 in region 947. This inner channel works in conjunction with a matching conical outer surface on a ferrule 942 to create a conical region 947, which captures and holds braided jacket 940. In system 900 the securing means holding braided jacket 940 is enhanced by applying an axial force on the end of ferrule 942 that is adjacent to the conical region 947. This force is applied in the embodiment of FIGS. 12-15 using a pair of captivating screws 988 (threaded into the swivel ball 944) to secure a captivating washer 989, which in turn applies a force in the direction of arrow 999 (parallel to the axis of ferrule 942), thus captivating jacket 940 in conical region 947 of ferrule 942 against the inner wall of channel 946 in ball 944. Washer 989 has a hole in it to permit cable 931 to pass therethrough.

Figure 16:
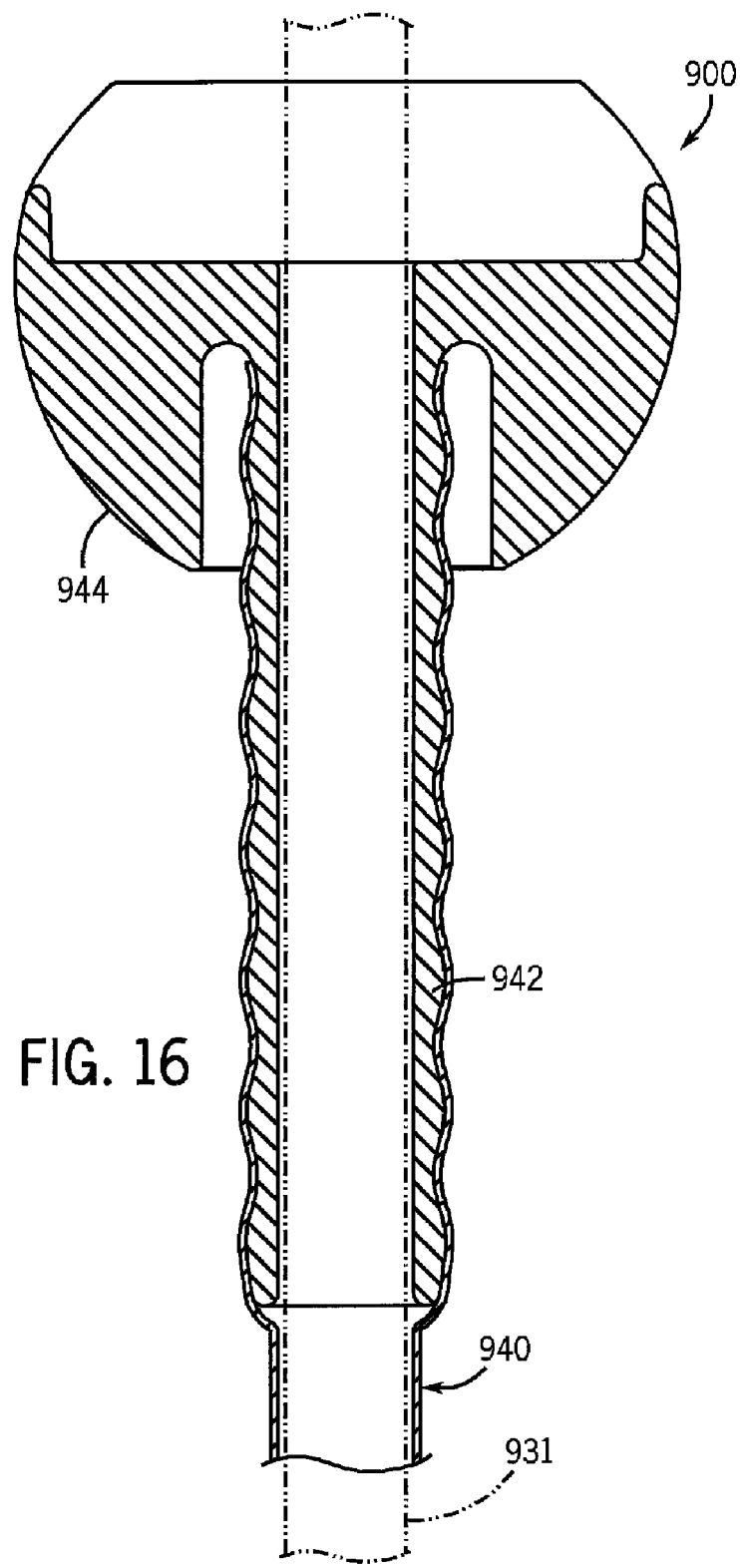
FIG. 16 is a cross-sectional view of a cable protection system having a unitary ball swivel and ferrule.

Whereas the ferrule supporting structure and ferrule have been distinct components in some embodiments described above (for example, with a swivel collar or swivel ball functioning as the ferrule supporting structure), in other embodiments, such as the one shown in FIG. 16, a ferrule with more surface area and/or peaks/valleys structure can be used to increase the gripping force of a braided jacket when it constricts, potentially eliminating the need for an external pinching by a collar or the like. In embodiments discussed above, the securing means has included a ferrule against which the protective jacket is held by an external ferrule supporting structure, such as a support collar or the like. Matching conical regions of the ferrule/ferrule supporting structure combination are used in some embodiments to hold the protective jacket. However, the collar or other "external" component can be eliminated if the protective jacket exerts a sufficient gripping force on the ferrule when a tensile axial force is applied to the protective jacket.

In such configurations, the ferrule has to possess enough surface area and/or peak and valley structure to enhance or increase the jacket's grip. Those skilled in the art can readily determine the dimensions, etc. required to achieve a suitable hold, depending on the weight of the suspended load and/or any other force applied to the protective jacket. Where a braided jacket is used, the braiding of the jacket can have sufficient contact area against the ferrule to frictionally transfer the entire load to the ferrule. In such a case, the "pinch region" of some embodiments is then unnecessary, and the securing means holding the protective jacket to the ferrule comprises the jacket and ferrule without the need for a distinct ferrule supporting structure. The ferrule and any ferrule supporting structure (swivel collar or ball, for example) can then be integral or unitary. For example, in the embodiment shown in FIG. 16, the ferrule 942, swivel ball 944, captivating screws 988 and captivating washer 989 have been combined into a single component, wherein the longer ferrule permits the braided jacket 940 to slide up over the extended ferrule without a pinch area. The braided jacket 940 would be held in place on the ferrule 942 until the tensile axial force was strong enough to cause the braided jacket 940 to constrict and grip the extended ferrule. In such an embodiment, the ferrule alone serves as the mounting support for the braided jacket (instead of the separate collar or ball element in embodiments described above) and, moreover, the ferrule and braided jacket function together as the securing means for holding the braided jacket to the ferrule.

The many features and advantages of the present invention(s) are apparent from the written description, and thus, the appended claims are intended to cover all such features and advantages. Further, since numerous modifications and changes will readily occur to those skilled in the art, the scope of the present invention(s) is not limited to the exact construction and operation as illustrated and described. Therefore, the described embodiments are illustrative and not restrictive, and the invention is not limited by or to the details given herein but should be defined by the following claims, interpreted as broadly as permitted, and their full scope of equivalents, whether foreseeable or unforeseeable now or in the future.

What is claimed is:

1. A conductor protection system configured to suspend an electrical device from an overhead mounting bracket, wherein a vertical loading force is generated when the electrical device is suspended, the system comprising:
    an insulated conductor passing through a first ferrule and a second ferrule, wherein the first ferrule and the second ferrule are separated by a suspension length of the insulated conductor;
    a protective jacket enclosing at least a portion of the first ferrule, at least a portion of the second ferrule and the suspension length of the insulated conductor;
    first jacket securing means comprising a first collar surrounding at least a portion of the protective jacket and at least a portion of the first ferrule, wherein the vertical loading force causes the protective jacket to be held between the first ferrule and the first collar; and
    second jacket securing means comprising a second collar surrounding at least a portion of the protective jacket and at least a portion of the second ferrule, wherein the vertical loading force causes the protective jacket to be held between the second ferrule and the second collar;
    wherein the protective jacket bears substantially all suspended weight of the electrical device and protects the insulated conductor from damaging suspension-induced stress.

2. The conductor protection system of claim 1 wherein the protective jacket comprises braided metal strands.

3. The conductor protection system of claim 1 wherein the first collar is held in the mounting bracket, and further wherein the second collar is held in the electrical device.

4. The conductor protection system of claim 1 wherein the first jacket securing means further comprises a captivating screw threaded into the first collar, wherein a screw head on the captivating screw applies an axial force to a first end of the first ferrule to improve holding of the braided jacket between the first collar and the first ferrule.

5. The conductor protection system of claim 1 wherein the first jacket securing means further comprises:
    a captivating washer abutting the first end of the first ferrule; and
    a captivating screw passing through the captivating washer and threaded into the first collar;
    wherein the captivating screw holds the captivating washer against the first end of the first ferrule to improve holding of the braided jacket between the first collar and the first ferrule.

6. The conductor protection system of claim 1 wherein the protective jacket comprises a braided jacket comprising a plurality of braided metal strands and further wherein the first collar comprises at least one of the following:
    a swivel collar;
    a swivel ball;
    a captivating mounting structure configured to maintain a generally consistent load amongst all strands of the braided jacket; and
further wherein the second collar comprises at least one of the following:
    a swivel collar;
    a swivel ball;
    a captivating mounting structure configured to maintain a generally consistent load amongst all strands of the braided jacket.

7. The conductor protection system of claim 1 wherein the insulated conductor couples the electrical device to a source of electricity, and further wherein the electrical device comprises at least one of the following:
    a lighting fixture;
    a light;
    a power strip;
    an audio device;
    a computer;
    a communication device;
    a video device;
    a television.

8. A cable protection system comprising:
    a cable passing through a ferrule;
    a braided jacket enclosing at least a portion of the ferrule and a segment of the cable; and
    jacket securing means comprising the braided jacket and the ferrule, wherein a generally axial tensile force applied to the braided jacket causes the braided jacket to constrict and to be held frictionally by the ferrule;
    wherein the braided jacket protects the cable segment from damaging stress induced by the axial tensile force.

9. The cable protection system of claim 8 further comprising a mounting bracket and a ferrule supporting structure coupled to the mounting bracket, wherein the ferrule and the ferrule supporting structure are unitary.

10. A cable protection system configured to couple an electrical device to an overhead mounting bracket, wherein an axial loading force is generated when the electrical device is coupled to the mounting bracket, the system comprising:
    a cable passing through a first ferrule, wherein the first ferrule and the coupled electrical device are separated by a connection length of the insulated conductor;
    a protective jacket enclosing the connection length of the cable and at least a portion of the first ferrule, wherein the protective jacket is coupled to the electrical device; and
    first jacket securing means comprising a first collar surrounding at least a portion of the protective jacket and at least a portion of the first ferrule, wherein the axial loading force causes the protective jacket to be held between the first ferrule and the first collar;
    wherein the protective jacket bears a substantial portion of the weight of the electrical device and protects the insulated conductor from damaging axial-force-induced stress.

11. The cable protection system of claim 10 wherein the protective jacket comprises a plurality of braided metal strands.

12. The cable protection system of claim 11 wherein the first collar is held in the mounting bracket.

13. The cable protection system of claim 11 wherein the first jacket securing means further comprises a captivating screw threaded into the first collar, wherein a screw head on the captivating screw applies an axial force to a first end of the first ferrule to provide a supplemental holding force on the braided jacket between the first collar and the first ferrule.

14. The cable protection system of claim 11 wherein the first jacket securing means further comprises:
   a captivating washer abutting the first end of the first ferrule; and
   a captivating screw passing through the captivating washer and threaded into the first collar;
   wherein the captivating screw holds the captivating washer against the first end of the first ferrule to provide a supplemental holding force on the braided jacket between the first collar and the first ferrule.

15. The cable protection system of claim 12 wherein the first collar comprises at least one of the following:
   a swivel collar;
   a swivel ball;
   a captivating mounting structure configured to maintain a generally consistent load amongst all strands of the braided jacket;
   a dynamic captivating mounting structure configured to maintain a generally consistent load amongst all strands of the braided jacket.

16. The cable protection system of claim 12 wherein the cable couples the electrical device to a source of electricity, and further wherein the electrical device comprises at least one of the following:
   a lighting fixture;
   a light;
   a power strip;
   an audio device;
   a computer;
   a communication device;
   a video device;
   a television.

17. The cable protection system of claim 12 wherein the electrical device is coupled to the protective jacket using a second ferrule held enclosed at least in part by the protective jacket and a second collar held in the electrical device, wherein the axial loading force causes the protective jacket to be held between the second ferrule and the second collar.

18. The cable protection system of claim 12 wherein the electrical device is suspended from the mounting bracket in one of the following orientations:
   directly vertically below the mounting bracket; or
   at an angle to vertical below the mounting bracket.

* * * * *